April 4, 1939.   H. BOLAS   2,152,835
AIRCRAFT
Filed March 13, 1937    4 Sheets-Sheet 1
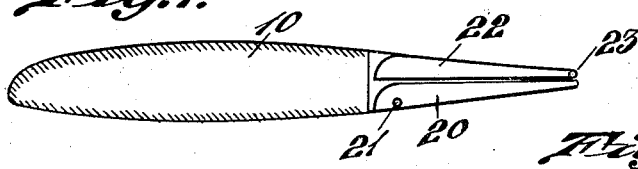
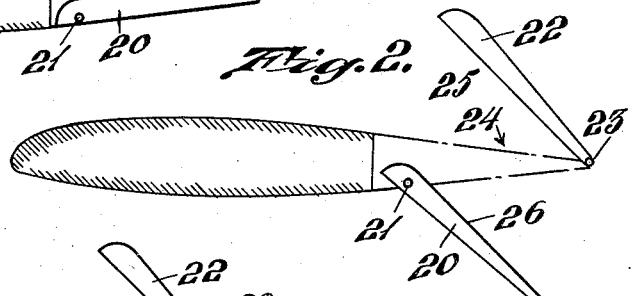
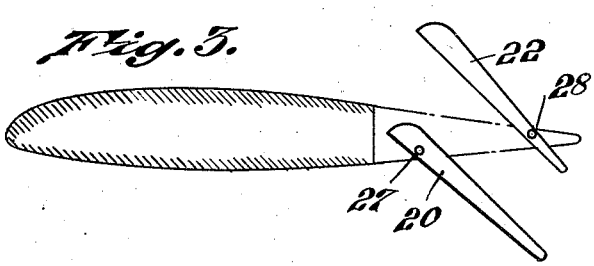
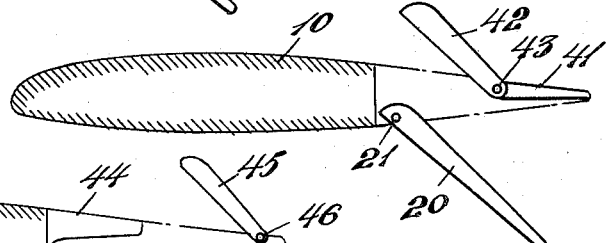
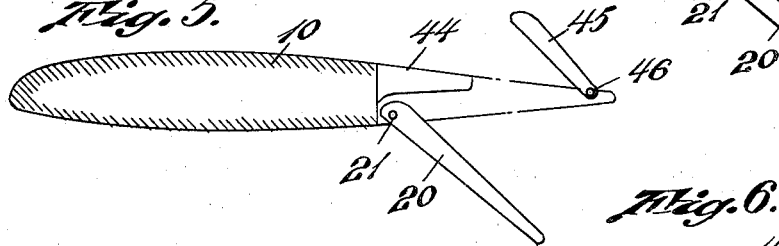
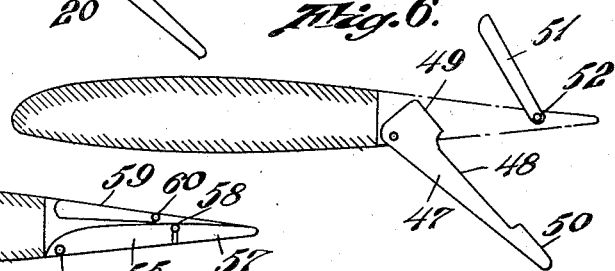
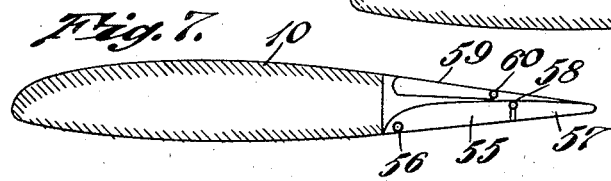
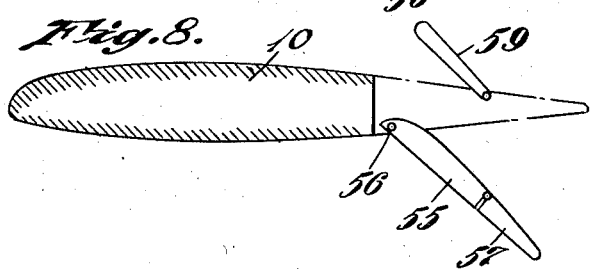
INVENTOR.
Harold Bolas
BY Barlow & Barlow
ATTORNEYS.

April 4, 1939.  H. BOLAS  2,152,835
AIRCRAFT
Filed March 13, 1937  4 Sheets-Sheet 2
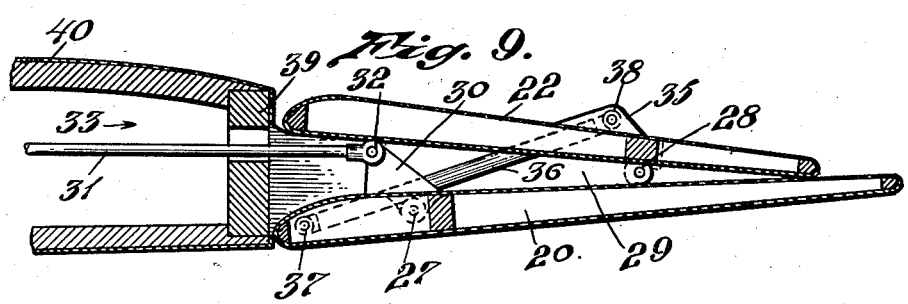
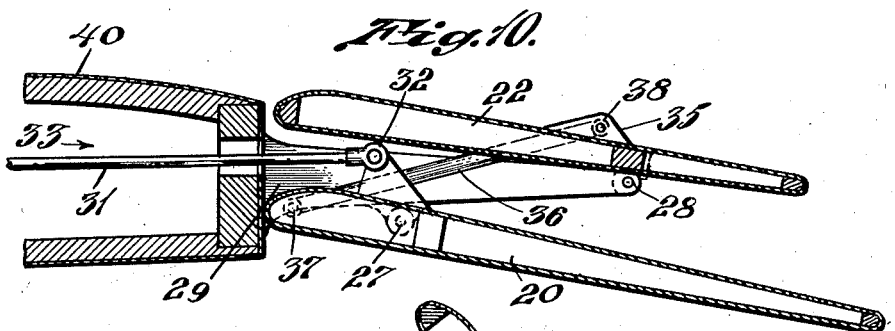
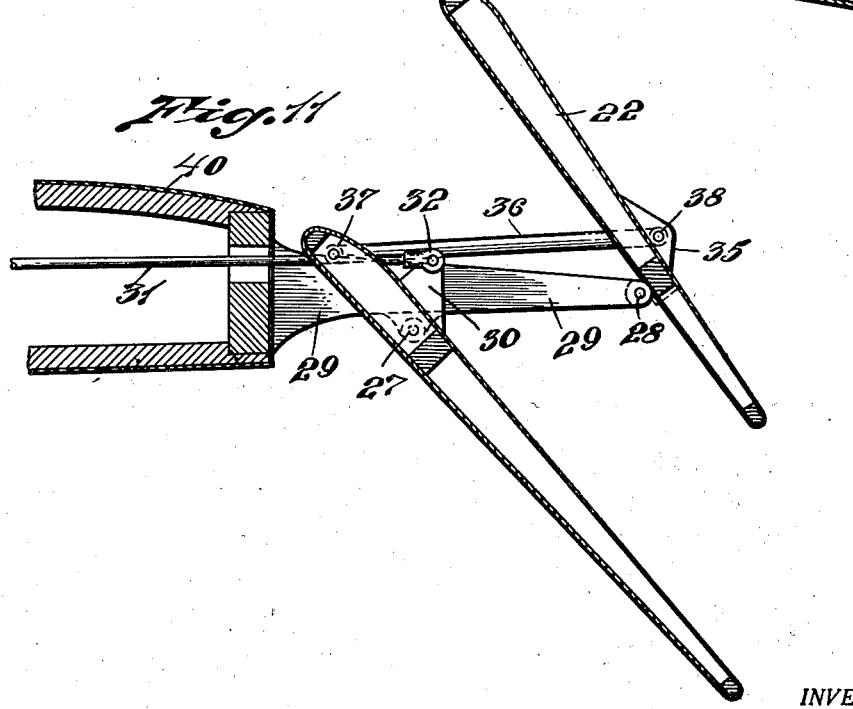
INVENTOR.
Harold Bolas
BY Barlow & Barlow
ATTORNEYS.

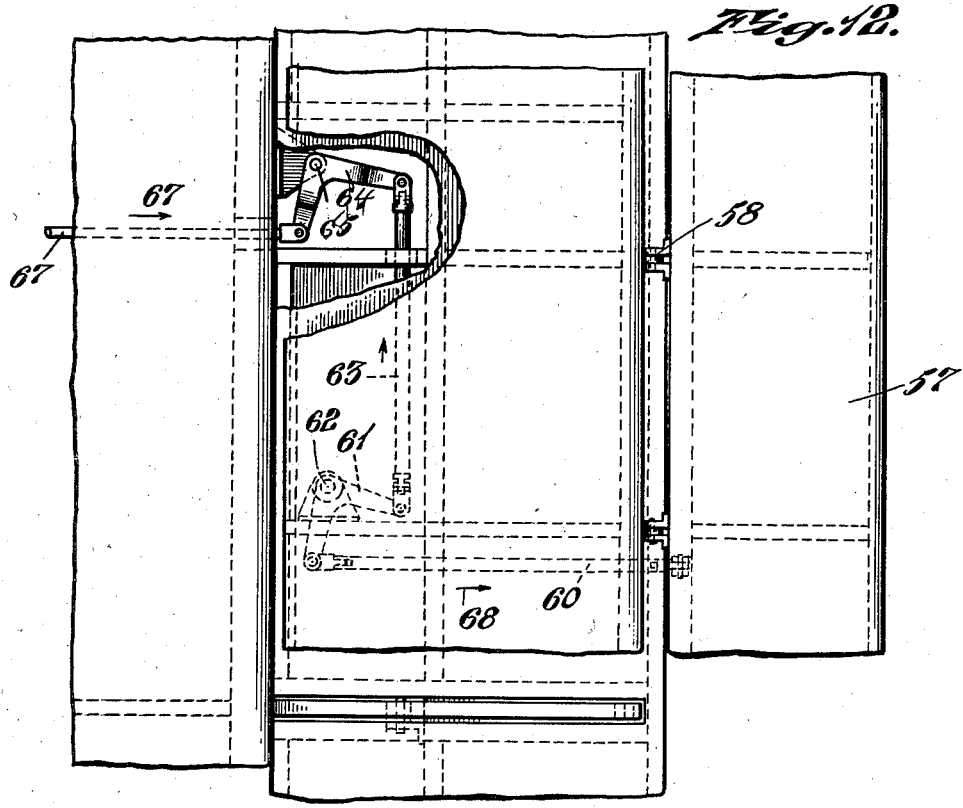

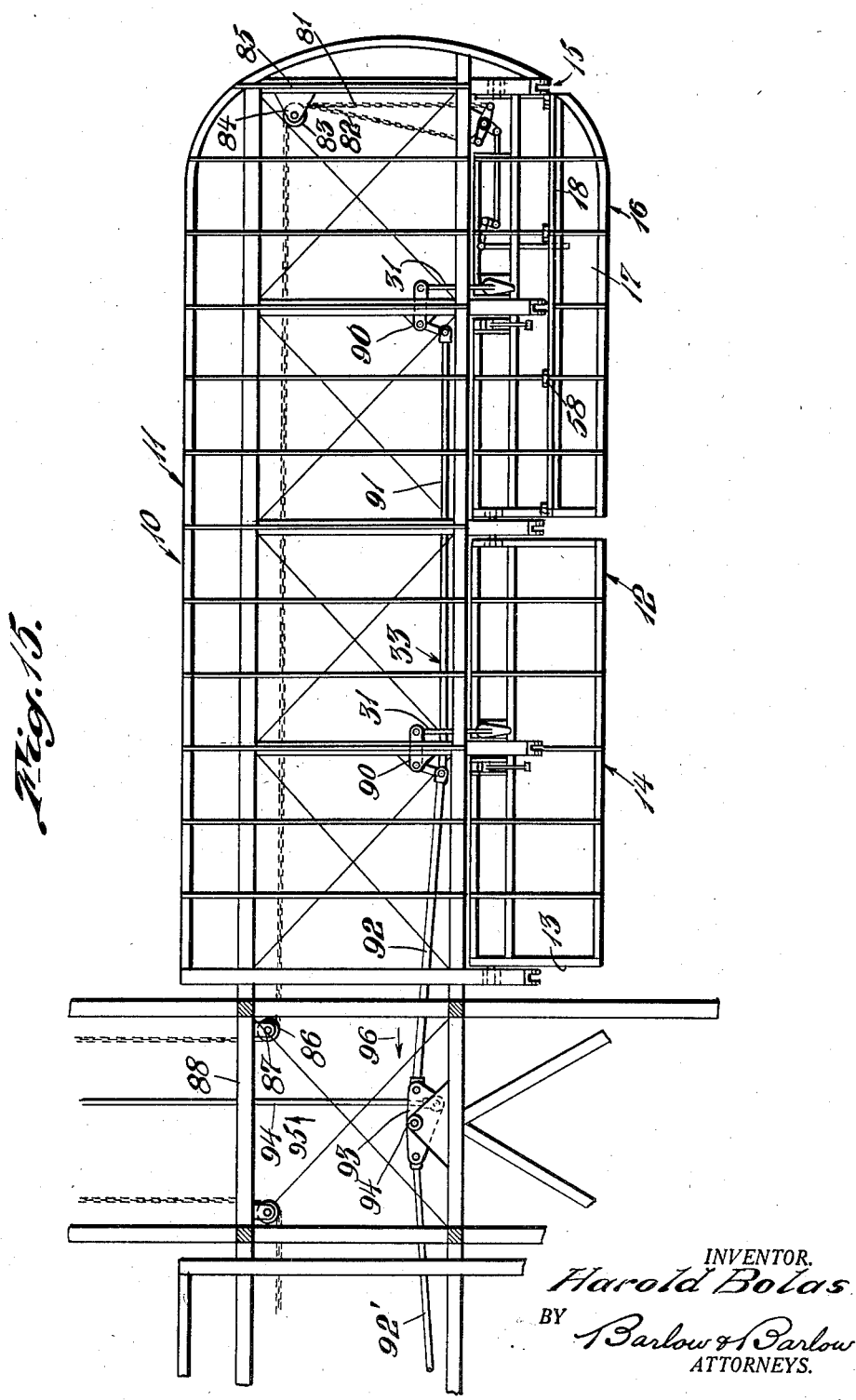

Patented Apr. 4, 1939

2,152,835

UNITED STATES PATENT OFFICE 2,152,835

AIRCRAFT

Harold Bolas, Providence, R. I.

Application March 13, 1937, Serial No. 130,743

10 Claims. (Cl. 244—42)

This invention relates in general to lift increasing devices for airfoils or airplane wings. It relates in particular to the type of lift increasing device commonly known as a "flap", where a certain proportion of the wing chord, usually towards the rear or trailing edge of the wing, is deflected downwards to increase lift and consequently to reduce flying speed.

Such devices also increase resistance or drag forces and steepen the angle of descent when landing, to this extent acting as "air brakes".

Various forms of flaps are known and are already in use. In its earliest and simplest form the rear or trailing portion of the airfoil forms the flap, a hinge joint being introduced between the nose or leading edge of the flap and the rear of the fixed or forward portion of the airfoil. When the flap is hinged down the effective camber of the airfoil is increased and hence also its lift properties at high angles of incidence are increased.

In certain cases the hinge joint is situated to the rear of the nose of the flap in which case a partial balance is secured and the loads required for operation are reduced.

Furthermore, a gap or "slot" has been provided between the nose of the flap and the rear end of the forward portion of the airfoil, such devices being known as slotted flaps, the function of such slot being to feed air to the upper side of the flap when in its downward deflected position and further increase lift by delaying stalling to a higher angle of incidence.

In the device known as the split flap the upper surface of the airfoil is continuous and remains unbroken from nose to trailing edge. The lower portion of the rear end of the airfoil is employed as a flap which may be hinged to the forward portion of the airfoil, either with or without a proportion of "balance" being provided.

In yet another device which is similar to and is an extension of the split flap method, the flap, in addition to being hinged downwards, is moved backwards bodily, thus increasing the chord as well as the camber of the wing and further enhancing lift.

All the devices thus described provide a definite increase in both lift and drag, thus leading to reduction in landing speed and increased angle of descent.

One object of this invention is to provide flap means differing from these described in which the lift of an airfoil is more effectively increased than heretofore and landing speed reduced. Another object is to provide flap means differing from those described whereby the drag is increased and angle of descent increased.

Yet another object is to provide flap means differing from these described, whereby both effective camber and effective wing area are increased, to increase lift and drag.

Still another object is to provide flap means whereby both effective camber and effective wing area are increased, while reducing the loads required for operation of such flap means.

Another object consists in provision of flap means whereby both effective camber and effective wing area are increased with simplification of control system.

A further object is to provide in combination flap means and aileron means so contrived that aileron operation is unaffected by flap position in relation to the main portion of the wing.

With these and other objects in view, the invention consists of certain novel features of construction, as will be more fully described, and particularly pointed out in the appended claims.

In the accompanying drawings:

Fig. 1 is a diagrammatic view somewhat of an end elevation showing an airfoil provided with a lower unbalanced flap and an upper flap having its hinge point at the trailing edge of the airfoil, both flaps conforming in position to the normal airfoil shape.

Fig. 2 is a view similar to Fig. 1 showing the lower flap depressed and the upper one raised for the high lift condition.

Fig. 3 is a similar view of a modified mounting of the flaps and showing both lower and upper flaps partially balanced, the hinge point of the lower flap being moved backwards while that of the upper flap is moved forwards, as compared with the arrangement of Figs. 1 and 2.

Figs. 4, 5, and 6 are similar diagrammatic views each a different modification of the mounting of the flaps and showing various means wherein only a portion of the upper rear surface is employed as a flap.

Fig. 7 is a diagrammatic view of a different modification showing an arrangement in which the rear portion of the lower flap acts as a tab or aileron being hingeably attached to the forward portion of said lower flap, the position indicated conforming to the normal airfoil shape.

Fig. 8 is a diagrammatic view of the structure of Fig. 7 when operated for the low speed condition.

Fig. 9 is a sectional view of the trailing edge portion showing a means of operating both flaps simultaneously, the position conforming to the normal airfoil shape.

Fig. 10 is a view similar to Fig. 9 with the flaps moved to a different position.

Fig. 11 is a view similar to Fig. 9 with the flaps moved to a high left position.

Fig. 12 is a plan view of the flap, and aileron and associated parts in which the rear portion of the lower flap acts as an aileron, and indicates a method of controlling said aileron.

Fig. 13 is a sectional view of the structure of Fig. 12.

Fig. 14 is a sectional view of a control rod.

Fig. 15 is a diagrammatic view illustrating a plan of actuating the flap and aileron from a similar control station.

The acting air is caused to be disposed in certain more or less known formations along the surfaces of an airfoil as it passes through the air. When a lift of the airplane takes place and the airfoil is inclined to the direction of motion the currents of air passing along the surface of the airfoil adhere closely to the airfoil until the angle of attack is at a certain steepness when the currents of air passing along the upper surface of the airfoil will leave the airfoil closely adjacent the leading edge thereof and there will be left along the remaining surface of the airfoil an unstable condition of flow. The angle at which this condition occurs is known as the "stall" angle and when this condition occurs the airplane is out of control so far as lift conditions exist and the nose of the plane will immediately drop.

According to the present invention the rear portion of the airfoil, forming part of the lower surface, is employed as a flap operating downwards, such flap being either hinged directly at its leading edge to the forward portion of the airfoil or alternatively having its hinge point more backwardly situated in order to secure a partial balance. In addition a rear portion of the airfoil forming part of the upper surface is also hingeable to constitute an additional flap.

In a preferred arrangement the upper, or additional, flap is hinged towards the trailing edge of the airfoil proper, such that the leading edge of such additional flap moves upwards when operated to increase lift and reduce speed. In these circumstances, the air forces on the upper flap tend to lift its leading edge and displace such flap further from the position it occupied when forming part of the original airfoil. On the other hand, the lower flap, when displaced downwards, tends under the acting air forces to return to its original position. If, therefore, these upper and lower flaps are interconnected for operation, a balancing effort is experienced, and hence the manual or other loads required for operation are reduced. Furthermore, the upper and secondary flap is subjected to lift and drag forces additional to those experienced by the airfoil proper and the overall effect is to increase the effective wing area in addition to increasing the camber.

The airfoil which has been referred to and which I deal primarily with in this application relates to the wing of the airplane, which with reference to Fig. 15 is designated generally 10. This wing has a leading edge 11 and a trailing edge 12. Substantially the entire length of the trailing edge is movable and these movable portions are termed flaps, which are designated generally 13. The flaps are divided into two parts, the inner flap being designated 14 and the outer flap being designated 15. This outer flap 15 is further divided so that its trailing edge 16 comprises an aileron or tab 17 which is hinged at its leading edge 18 to the outer flap 15 so as to swing upwardly or downwardly with relation to this outer flap to control the trim of the airplane. The upper flaps are not shown in Fig. 15.

The figures which I have shown although they are largely diagrammatical indicate generally sections of the wing 10 taken either through the inner flap 14 or through the outer flap 15 and its aileron 17. Figs. 1 to 6 and 9 to 11 deal with the section through the inner flap 13, whereas Figs. 7 and 8 and 12 to 14 deal primarily with the structure along a section through the outer flap and its aileron.

In all of these figures I have arranged for two flaps one above the other with the upper flap having its leading edge moving upwardly and the lower flap having its trailing edge moving downwardly. By this arrangement the upper flap directs a current of air along the upper surface of the airfoil downwardly over the upper surface of the lower flap so as to cause this air current to follow the upper surface of the airfoil where the angle of attack is steep for a longer time than would otherwise occur and thus delays the stall, and also serves in landing to more effectively create an increased drag that a more vertical descent may be had.

Various arrangements of such flaps may be provided. In Fig. 1 the airfoil which is designated generally 10 is provided with a lower flap 20 pivoted at its forward edge as at 21 while there is provided an upper flap 22 pivoted at its trailing edge 23, these flaps being disposed in closed normal flying condition and conforming generally to the basic shape of the airfoil. In Fig. 2 these flaps are shown as opened up by the depressing of the lower flap 20 and raising of the upper flap 22 to provide a passageway 24 between these flaps so as to guide the air downwardly along the lower surface 25 of the flap 22 and along the upper surface 26 of the flap 20. This position of Fig. 2 shows the arrangement for a high angle of attack or lift condition or for a low speed condition which might be desired upon descending. It will also be apparent that when the flaps are arranged as here illustrated that an increase of wing area as well as that of effective camber is provided.

In Fig. 3 a similar arrangement is provided except in this case the lower flap 20 is pivoted as at 27 rearwardly from its leading edge and the upper flap 22 is pivoted as at 28 forwardly of its trailing edge so that both flaps are partially balanced. The advantage of this arrangement is to reduce the control forces necessary to operate the flaps. The arrangement shown in Fig. 3 is perhaps most desirable and I have illustrated in more detail the operation of the flaps such as shown in Fig. 3. The flaps are both pivoted on a rigid cantilever rib 29 (see Figs. 9, 10 and 11). A bracket 30 is shown as mounted upon the lower flap 20 adjacent its pivot 27 to provide a lever member and a control operating rod 31 is pivoted to this bracket or lever as at 32, the arrangement being such that when the rod is thrust in the direction of the arrow 33 it will cause this flap 20 to move about its pivot 27, having the effective leverage for operation of the distance between the pivots 27 and 32, so as to swing the flap 20 about the pivot 27 to a position illustrated in Fig. 11, or any intermediate position, such, for instance, as shown in Fig. 10, and at the same time the upper flap 22 is swung about its pivot 28 by a lever 35 through link 36 connected to the lever and to the leading edge of the lower flap 20 as by pivotal connections 37 and 38. The leverage arrangement is such that a slight movement of the operating rod 31 will cause a substantial movement of the lower flap 20 and but a slight movement of the upper flap 22. This condition is portrayed in Fig. 10, which is the condition during take-off, it being of advantage to increase the wing camber and hence the lift but slightly during take-off, as the camber reduces the acceleration, and as the upper flap 22 is moved but little it will not serve to reduce the acceleration. In Fig. 10 the lower flap has been depressed from its original position about 15 degrees, whereas the upper flap has been raised not more than through five degrees, and moreover, the leading edge of the upper flap has not yet emerged from behind the rear spar 39 of the fixed wing portion 40. The arrangement, therefore, as far as take-off is concerned, is comparable with the normal type of split flap in which the upper surface of the wing remains unaltered. The advantage of this method of leverage lies in reduction of drag during take-off. The open position such as shown in Fig. 11 is used for high angle of attack or for landing where it is desired that the wing drag become large and serves to steepen the angle of descent, this condition being very undesirable where acccleration is desired.

Figs. 4, 5 and 6 show other arrangements of the two flaps which are employed, the flaps in these cases all being unbalanced or being hinged at their leading or trailing edges. In Fig. 4 a portion of the upper surface of the general airfoil designated 41 at the trailing edge thereof is fixed and the upper flap 42 is hinged as at 43 at its trailing edge to the leading edge of this fixed portion 41, thus reducing the length of the flap 42 in the fore and aft direction of motion. The lower flap 20 is as heretofore described and is pivoted as at 21 comparable to the flap shown in Figs. 1 and 2. In Fig. 5 there is an upper fixed portion of the airfoil 44 secured to the main body portion of the airfoil 10 to overhang the lower flap while the flap 45 is hinged at its trailing edge 46 to the trailing edge of the generic basic shape of the airfoil. The lower flap 20 in this figure is pivoted as at 21 as heretofore described, and its leading edge portion houses beneath the fixed portion 44 above mentioned. In Fig. 6 the lower flap is modified from that of the figures heretofore described and is designated 47. It has a recessed portion 48 which is intermediate its length with upper portions 49 and 50 conforming to the generic basic airfoil while the recessed portion 48 receives the upper flap 51 pivoted at its trailing edge 52 when the flaps are in the closed condition as shown in Fig. 1 but which when opened up are as illustrated in Fig. 6.

In all of these Figs. 4, 5, and 6 the flaps are pivoted to ribs and an arrangement for operation of the flaps may be had similar to that illustrated in Figs. 9, 10 and 11 which have been described in greater detail.

In Figs. 7, 8, 12, 13 and 14 the showing includes the aileron at the trailing edge of the flap. The body portion of the airfoil is designated 10 as heretofore and the lower flap is designated 55 which is pivoted as at 56 with the aileron portion of this lower flap designated at 57 and hinged as at 58. The upper flap is in each of these cases shorter than the lower flap and is designated generally 59 and pivoted as at 60 to a rib at a point forward of the hinged connection of the aileron.

The open position of the flaps is shown in Fig. 8 although the aileron or tab has not been operated in this figure. The upper and lower flaps are operated similarly to that heretofore described, while the aileron arrangement is indicated for operation more particularly in Figs. 12 to 14. These figures show the operating parts for the aileron alone for clearness. In order to swing the ailerons 57 about the hinge 58 I provide an operating rod 60 which is secured to the aileron 57 at one end with its opposite end connected to one arm of a bell crank lever 61 pivoted as at 62, the opposite arm of which is connected by link 63 to an arm of a second bell crank lever 64 pivoted at 65 to a bracket fixed to the body of the airfoil, the other arm of which is connected to a rod 66 which if given a movement in the direction of arrow 67 will cause the bell crank lever 64 to be swung around its pivot 65 moving the link 63 and bell crank lever 61 to cause the rod 60 to be moved in the direction of arrow 68 and cause the aileron to be swung about its hinged connection 58 upwardly. The link 63 is arranged in line with the pivot for the lower flap 55 so that the aileron will not swing on its hinge 58 during movement of the lower flap and yet may be swung with the flap in various positions.

The link 63 is so arranged that a hinge and swinging movement may be had. For instance, the link consists specifically of a tube 70 having a plug 71 fixed in one end with an ear 72 to fit between the ears 73 and be pivoted therein as at 74, while at its opposite end there is a member 75 fixed in the end of the tube to which is swivelly connected as by pin 76 an ear 77 to fit between the ears 78 and be pivoted therein as at 79. Thus there may be a movement of the link 63 about its own longitudinal axial center as well as a movement up and down or laterally by reason of the pivots of the members 73 and 78 connecting with the bell crank levers by means of the pivot pins 80. The flaps are cut away about the bell crank sufficiently to permit of a movement of this flap about its hinged connection at its leading edge to the body of the airfoil.

In order to show the general arrangement of the controls for flaps and ailerons described, I have shown a skeleton view with the upper flaps omitted, I show a modified connection for the control of the ailerons, that is, instead of having a rod 65 I have shown a pair of flexible members 81 and 82 which are a known alternate control for the rod such as at 65, these flexible members or chains are trained over a pair of pulleys 83 pivoted as at 84 to one of the ribs 85 and thence over another pair of pulleys 86 pivoted on a bracket 87 to one of the spars 88 and from thence into the control cockpit. The opposite wing has a similar control. The flap controls illustrate both of the rods 31 as connected to bell crank levers 90 which bell crank levers are connected together by a link 91 and are in turn operated by a link 92 connected to a lever 93 pivoted as at 94 and shown as having a balanced arrangement between the link 92 and 92' for operating the opposite wings. This lever 93 is operated by rod 94 leading to the control cockpit such that pulling on the rod in the direction of the arrow 95 will cause a movement of the link 92 in the direction of the arrow 96 to cause a downward movement of the flaps as described in connection with Fig. 9.

Furthermore, the ailerons may be provided with differential angle action which will remain constant at all times, a state of affairs which has not hitherto proved possible where flap and ailerons were operated through a common mechanism.

It will be obvious that similar or other suitable arrangements could be provided to apply to the case of "tabs" employed for the purpose of lateral trim as apart from lateral control.

With regard to Figs. 1 to 11 inclusive and Fig. 13, it will be observed that the hinge point of the upper flap is shown as being situated rearwardly of the hinge point of the lower flap and that when the flaps are operating towards the high lift position an air passage is provided between the flaps, thus allowing the air stream to pass from above the upper contour of the wing to below the lower contour thereof for the purposes of deflecting air upon the upper surface of the lower flap and also producing additional lift by reason of the presence of the upper flap.

I have illustrated and described preferred and satisfactory embodiments of my invention, but it will be obvious that changes may be made therein, within the spirit and scope thereof, as defined in the appended claims.

I claim:

1. In aircraft, a wing having a relatively fixed portion, a rearwardly situated upper flap pivotally attached thereto, a rearwardly situated lower flap pivotally attached thereto, the pivot of said upper flap being arranged rearwardly of the pivot of the lower flap, said flaps being arranged so that in the normal or high speed condition of flight the top surface of the upper flap conforms closely to the upper contour of the wing airfoil, and the bottom surface of the lower flap conforms closely to the lower contour of the wing airfoil, means to raise the leading edge of said upper flap and means to lower the trailing edge of said lower flap when operating to the high lift or low speed condition of flight, and air passage means between said flaps extending from above the upper contour of said wing to below the lower contour thereof whereby to deflect the air stream upon the upper surface of the lower flap from above the upper contour of the wing.

2. In an aircraft, a wing having a relatively fixed portion, a plurality of movable upper and lower flaps pivotally attached thereto, the pivots of said upper flaps being arranged rearwardly of the pivots of the lower flaps, the arrangement being such that when the flaps are in the normal or high speed condition of flight the top surfaces of the upper flaps conform closely to the upper contour of the wing airfoil, and the bottom surfaces of the lower flaps conform closely to the lower contour of the wing airfoil, means to raise the leading edges of said upper flaps and means to lower the trailing edges of said lower flaps when operating to the high lift or low speed condition of flight, and air passage means between said flaps extending from above the upper contour of said wing to below the lower contour thereof whereby to deflect the air stream upon the upper surface of the lower flap from above the upper contour of the wing.

3. In aircraft, a wing having a relatively fixed portion, a rearwardly situated upper flap pivotally attached thereto, a rearwardly situated lower flap pivotally attached thereto, the pivot of said upper flap being arranged rearwardly of the pivot of the lower flap, said flaps being arranged so that in the normal or high speed condition of flight the top surface of the upper flap conforms closely to the upper contour of the wing airfoil, and the bottom surface of the lower flap conforms closely to the lower contour of the wing airfoil, means interconnecting the upper and lower flaps at such points of location that when the leading edge of the upper flap is raised the trailing edge of the lower flap is lowered, means to control said combined flap action when operating to the high lift or low speed condition of flight, and air passage means between said flaps extending from above the upper contour of said wing to below the lower contour thereof whereby to deflect the air stream upon the upper surface of the lower flap from above the upper contour of the wing.

4. In aircraft, a wing having a relatively fixed portion, a rearwardly situated lower flap pivotally mounted thereon and arranged to hinge downwards at its trailing edge, a rearwardly situated upper flap pivotally mounted thereon and arranged to hinge upwards at its leading edge, the pivot of said upper flap being arranged rearwardly of the pivot of the lower flap, link means interconnecting said upper and lower flaps, means to control said combined flap action, and air passage means between said flaps extending from above the upper contour of said wing to below the lower contour thereof whereby to deflect the air stream upon the upper surface of the lower flap from above the upper contour of the wing.

5. In aircraft, a wing having a relatively fixed portion, a rearwardly situated lower flap pivotally mounted thereon and arranged to hinge downwards at its trailing edge, a rearwardly situated upper flap pivotally mounted thereon and arranged to hinge upwards at its leading edge, the pivot of said upper flap being arranged rearwardly of the pivot of the lower flap, means interconnecting said upper and lower flaps for different angular movement so that the lower flap may be depressed to the position required for take-off without unduly increasing the drag of the upper flap, and air passage means between said flaps extending from above the upper contour of said wing to below the lower contour thereof whereby to deflect the air stream upon the upper surface of the lower flap from above the upper contour of the wing.

6. In aircraft, in combination, a wing having a relatively fixed portion, a rearwardly situated upper flap pivotally attached thereto, a rearwardly situated lower flap pivotally attached thereto, the pivot of said upper flap being arranged rearwardly of the pivot of the lower flap, an aileron forming a rear part of and hingeably attached to one such flap, means to raise the leading edge of said upper flap and means to lower the trailing edge of said lower flap when operating to the high lift or low speed condition of flight, means to operate said ailerons for lateral control, and air passage means between said flaps extending from above the upper contour of said wing to below the lower contour thereof whereby to deflect the air stream upon the upper surface of the lower flap from above the upper contour of the wing.

7. In aircraft, in combination, a wing having a relatively fixed portion, a rearwardly situated upper flap pivotally attached thereto, a rearwardly situated lower flap pivotally attached thereto, the pivot of said upper flap being arranged rearwardly of the pivot of the lower flap, an aileron forming a rear part of and hingeably attached to one such flap, means to raise the leading edge of said upper flap and means to lower the trailing edge of said lower flap when operating to the high lift or low speed condition of flight, means to operate said ailerons for lateral control, said aileron control means being such that operation of the ailerons is unaffected by operation of the flaps, and air passage means between said flaps extending from above the upper contour of said wing to below the lower contour thereof whereby to deflect the air stream upon the upper surface of the lower flap from above the upper contour of the wing.

8. In aircraft, in combination, a wing having a relatively fixed portion, a rearwardly situated upper flap pivotally attached thereto, a rearwardly situated lower flap pivotally attached thereto, the pivot of said upper flap being arranged rearwardly of the pivot of the lower flap, an aileron forming the trailing part of and pivotally attached to said lower flap, interconnected means to raise the leading edge of said upper flap and to lower the trailing edge of said lower flap and aileron when operating to the high lift or low speed condition of flight, means to independently operate said ailerons for lateral control, and air passage means between said flaps extending from above the upper contour of said wing to below the lower contour thereof whereby to deflect the air stream upon the upper surface of the lower flap from above the upper contour of the wing.

9. In aircraft, in combination, a wing having a relatively fixed portion, a rearwardly situated upper flap pivotally attached thereto, a rearwardly situated lower flap pivotally attached thereto, the pivot of said upper flap being arranged rearwardly of the pivot of the lower flap, an aileron forming the trailing part of and pivotally attached to said lower flap, interconnected means to raise the leading edge of said upper flap and to lower the trailing edge of said lower flap and aileron when operating to the high lift or low speed condition of flight, means to operate said ailerons for lateral control said aileron control means being such that operation of the ailerons is unaffected by operation of the flaps, and air passage means between said flaps extending from above the upper contour of said wing to below the lower contour thereof whereby to deflect the air stream upon the upper surface of the lower flap from above the upper contour of the wing.

10. In aircraft, a wing having a relatively fixed portion, a rearwardly situated upper flap pivotally attached thereto, a rearwardly situated lower flap pivotally attached thereto, the pivot of said upper flap being arranged rearwardly of the pivot of the lower flap, the arrangement being such that when the flaps are in the normal or high speed condition of flight the top surface of the upper flap conforms closely to the upper contour of the wing airfoil and the bottom surface of the lower flap conforms closely to the lower contour of the wing airfoil, an aileron forming the trailing part of and pivotally attached to said lower flap, said pivot being close to or slightly at the rear of the trailing edge of said upper flap, interconnected means to raise the leading edge of said upper flap and to lower the trailing edge of said lower flap and aileron when operating to the high lift or low speed condition of flight, means to operate said ailerons for lateral control, said means being such that operation of the aileron is unaffected by operation of the flaps, and air passage means between said flaps extending from above the upper contour of said wing to below the lower contour thereof whereby to deflect the air stream upon the upper surface of the lower flap from above the upper contour of the wing.

HAROLD BOLAS.